March 19, 1940.   H. V. ATWELL   2,193,797
PROCESS FOR CONVERTING HYDROCARBONS
Filed May 23, 1936
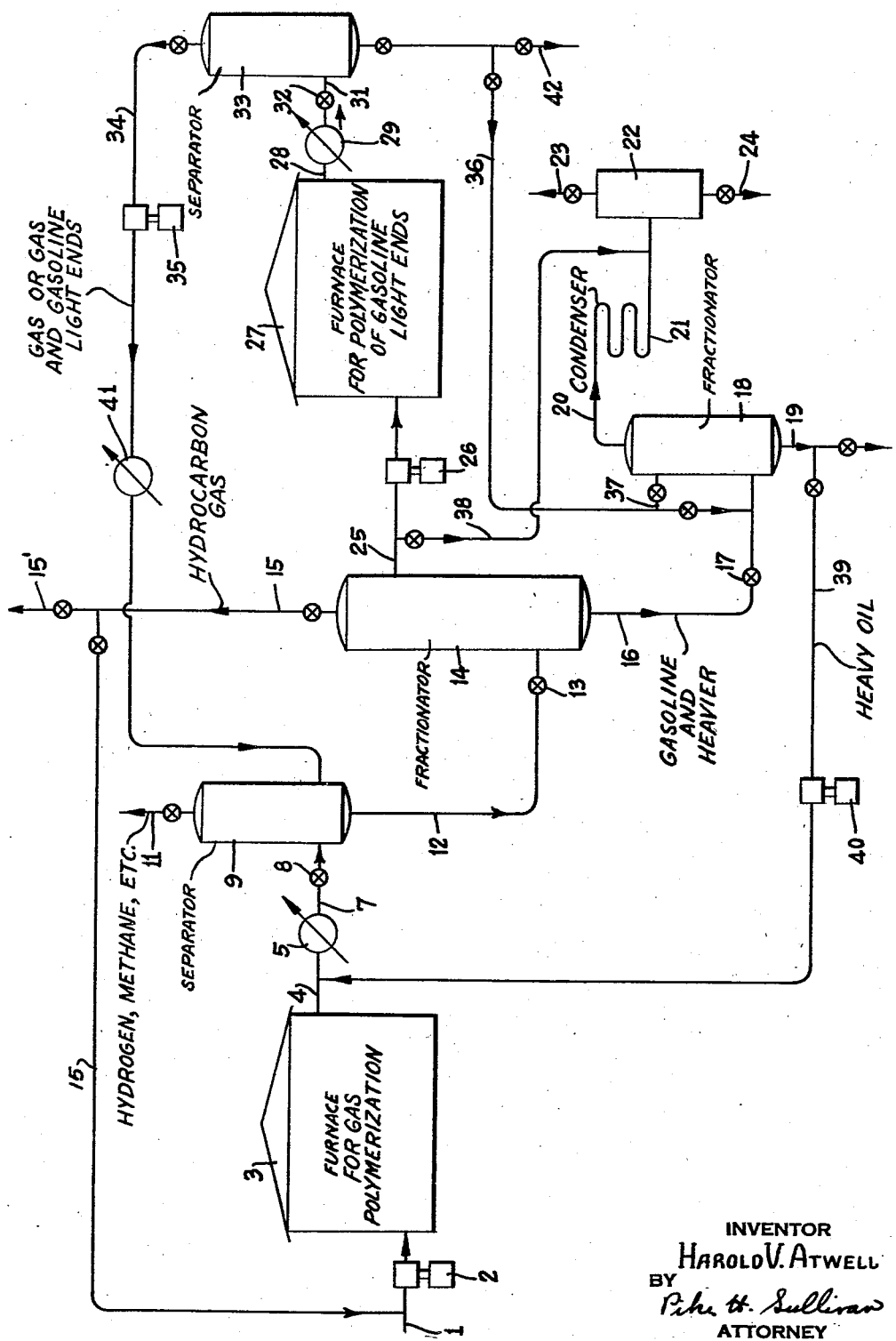
INVENTOR
HAROLD V. ATWELL
BY
ATTORNEY Patented Mar. 19, 1940

2,193,797

UNITED STATES PATENT OFFICE 2,193,797

PROCESS FOR CONVERTING HYDROCARBONS

Harold V. Atwell, White Plains, N. Y., assignor to Process Management Company, Inc., New York, N. Y., a corporation of Delaware Application May 23, 1936, Serial No. 81,375

13 Claims. (Cl. 196—10)

This invention relates to the treatment of normally gaseous hydrocarbons and more especially to the polymerization of normally gaseous hydrocarbons containing unsaturated constituents.

Processes involving the conversion of hydrocarbon gases by heat and pressure, without the aid of a catalyst, are generally known as thermal processes. In the thermal polymerization of normally gaseous hydrocarbons and particularly hydrocarbons containing both saturated and unsaturated constituents having two to four carbon atoms per molecule, it is generally the practice to separate the polymerization products into a liquid fraction containing gasoline and heavier, a fixed gas fraction, such as hydrogen and methane, and a normally gaseous hydrocarbon fraction intermediate the gasoline and heavier fraction and the fixed gas fraction. In such operations, in order to achieve the ultimate yield of motor fuel, provision is made for recycling the intermediate fraction for reprocessing in the same or similar cycle.

In the thermal polymerization of normally gaseous hydrocarbons, the gasoline polymer produced thereby has been found in some instances to contain an excess of the lower boiling constituents commonly referred to as light ends within the gasoline boiling point range. A gasoline containing an excess of light ends will naturally be of extreme volatility. It is generally appreciated that there is a demand at the present time for the presence of light ends in a gasoline to give the desired volatility and the gasoline polymer produced by the thermal polymerization process is satisfactory in that respect. However, there is an increasing interest in gasoline having a relatively small content of the usual low boiling constituents and hence low volatility, but at the same time a high anti-knocking rating. One advantage of such fuels is their reduced fire hazard, which is of particular importance in aviation.

It is an object of my invention to provide a multi-stage thermal polymerization process wherein the excess of light ends formed in producing the polymer gasoline is further treated to produce a motor fuel of valuable characteristics.

Another object of my invention is to provide a multi-stage thermal polymerization process wherein the excess of light ends from the first stage is separately polymerized under optimum conditions to produce a motor fuel of low volatility and high anti-knock rating.

With these and other objects in view, which may be incident to my improvements, the invention consists in the procedure hereinafter set forth which may be varied without departing from the spirit and scope thereof.

In order to make my invention more clearly understood, reference is had to the accompanying drawing, which forms a part of my specification, wherein the single figure is a somewhat diagrammatic elevational view of apparatus capable of carrying out my invention.

Referring to the drawing, hydrocarbon gases from any suitable source, such as refinery gases, and preferably containing both saturated and unsaturated constituents of from two to four carbon atoms per molecule preheated in a conventional manner, not shown, are passed through a line 1 by a pump 2 to a furnace 3 which is diagrammatically illustrated in the drawing. The furnace 3 may be of any suitable type provided with interconnected tubes of restricted cross-sectional area. The hydrocarbon gases in passing through the furnace 3 are heated to a temperature of between 900° and 1200° F., preferably about 1050° F., while being maintained under a pressure of between 750 and 5000 lbs. per sq. in., preferably about 2000 lbs. per sq. in., and for a period of time of from about one to three minutes to accomplish the desired conversion or polymerization of normally gaseous hydrocarbons to normally liquid hydrocarbons. The polymerized products leaving the furnace 3 are passed through a line 4 to a suitable cooler 5 wherein they are cooled to a temperature sufficiently low to prevent further reaction. If desired, the polymerized products may be intimately contacted with a hydrocarbon oil, such as an oil heavier than gasoline produced in the polymerization system or from an extraneous source, prior to passage of the polymerized products through the cooler 5. The thus cooled products, upon leaving the cooler 5, are passed through a line 7, controlled by a valve 8, to a high-pressure separator or fractionator wherein separation between gaseous and liquid products is effected. It is preferred to maintain the separator or fractionator 9 at an elevated superatmospheric pressure, but preferably lower than that maintained on the gases passing through the furnace 3.

The appropriately cooled polymerized products entering the separator or fractionator 9 are therein separated into a gaseous fraction and a liquid fraction, the liquid fraction containing those normally gaseous hydrocarbons heavier than methane or ethane. The gaseous fraction, comprising mostly hydrogen and methane, is withdrawn from the tower 9 through a valve line 11 and removed from the system. These gases may be subjected to further treatment in conventional apparatus, not shown, for fractionation and for absorption to improve the efficiency of recovery of desired liquefiable components therefrom to be combined with the liquid withdrawn in fractionator 9. The liquid fraction is withdrawn from the tower 9 through a line 12 controlled by a pressure-reduction valve 13 and conducted to a fractionating column 14 maintained at a pressure lower than that maintained on the tower 9. The fractionator 14 may be of the usual type provided with suitable fractionating means, such as bubble trays or packing. Fractionation within the column 14 is controlled so as to separate the polymerized products into a fraction containing $C_4$ hydrocarbons and lighter, a fraction containing the heavier ends of gasoline and oil heavier than gasoline, and an intermediate fraction containing the light ends of gasoline.

The first-mentioned fraction, comprising both saturated and unsaturated hydrocarbons containing constituents of from two to four carbon atoms per molecule, is withdrawn from the fractionator 14 through a line 15 and returned to the line 1 for reprocessing in the same cycle. If desired, the process may be operated on a once-through basis by diverting this gas through valved line 15'. The fraction containing the gasoline polymer and heavier, without an excess of light ends being retained therein, is withdrawn from the fractionator 14 through a line 16, controlled by a pressure-reduction valve 17, and conducted to a fractionating column 18 similar to the fractionating column 14 but preferably maintained under a lower pressure. The liquid polymer entering the fractionator 18 is therein fractionated to separate therefrom liquid oil heavier than the desired motor fuel. This liquid oil which comprises gas oil and some tarry material is withdrawn from the fractionator 18 through a line 19 and removed from the system. If desired, part of the oil withdrawn through the line 19 may be returned through line 39 by pump 40 to intimately contact the hot products of polymerization passing through the line 4 to accomplish cooling of these products. Hydrocarbon vapors within the gasoline boiling point range are withdrawn from the fractionator 18 through a line 20 and passed through a condenser 21 to a gasoline receiver 22. Any uncondensed gases entering the receiver 22 may be withdrawn therefrom through a line 23, the final gasoline polymer being withdrawn from the receiver 22 through a line 24.

The fraction containing the light ends of gasoline separated in the fractionator 14 is collected therein on a suitable trap-out tray, not shown. This fraction comprising mainly the $C_5$ and $C_6$ hydrocarbons, including possibly some $C_4$ hydrocarbons and optionally considerable amounts of slightly higher boiling hydrocarbons, is withdrawn from the fractionator 14 through a line 25 and forced by a pump 26 through a furnace 27 which is provided with a plurality of interconnected tubes of relatively small cross-sectional area. These light ends of the polymer gasoline passing through the furnace 27 are therein heated to a temperature of between 800° and 1000° F., preferably about 900° F., while being maintained under a pressure of between 750 and 5000 lbs. per sq. in., preferably about 2000 lbs. per sq. in., for a sufficient period of time to accomplish the desired polymerization of the light ends of gasoline into heavier gasoline constituents. The time required to accomplish the desired polymerization of the light ends is longer than that required to accomplish the polymerization of the initial normally gaseous charge passed through the furnace 3. I prefer, in conducting the polymerization of the light ends of gasoline, to maintain them within the furnace 27 for a period of from about three to ten minutes. If desired, this longer period of time may be effected by passing the products from furnace 27 into a suitable reaction chamber, not shown, the reaction chamber serving in this instance as a soaking zone for the material being polymerized. The polymerized products after the desired heating and soaking thereof are passed from the furnace 27 or the reaction chamber, as the case may be, through a line 28 to a suitable cooler 29. The hot polymerized products in passing through the cooler 29 are therein cooled to a temperature below that of active polymerization. In addition to the cooler 29, the hot polymerized products may be intimately contacted with a hydrocarbon oil to accomplish the desired cooling thereof. This hydrocarbon oil may be oil withdrawn through the line 19 or oil from an extraneous source. The appropriately cooled products leaving the cooler 29 are conducted through a line 31, having a pressure-control valve 32 therein, to a separator or fractionator 33 maintained under superatmospheric pressure but preferably at a pressure lower than that maintained on the light gasoline constituents passing through the furnace 27.

The polymerized products entering the separator or fractionator 33 are therein fractionated to separate normally gaseous hydrocarbons formed during the polymerization of the light ends of the gasoline from normally liquid products. The normally gaseous products containing generally both saturated and unsaturated hydrocarbons of from two to four carbon atoms per molecule and lighter are withdrawn from the separator or fractionator 33 through a line 34 and passed by a pump 35 through a partial condenser 41 to the separator or fractionator 9. In returning this cooled gaseous fraction to the tower 9 in partially liquefied condition, further separation thereof will be accomplished whereby appropriate processing of the various constituents contained therein is made possible. The liquid hydrocarbons separated in the tower 33 are withdrawn therefrom through a line 36 and passed to the fractionator 18 which likewise receives the liquid products from the fractionator 14. As shown, these liquid products may be separately passed to the fractionator 18 through a line 37 or, if desired, they may be merged with the liquid products from the fractionator 14 prior to entry thereof into the fractionator 18. It will thus be evident that my invention provides a process wherein the polymer gasoline produced in each stage thereof is separated from heavier oil and recovered as a blended polymer gasoline.

It is generally preferred, in accordance with my invention, to produce a gasoline polymer having an end point below 400° F. and preferably one having an end point between 300° F. and 350° F. If the volatility of the gasoline recovered in the receiver 22 is lower than that desired, provision is made in accordance with my process for increasing the volatility thereof. For this purpose, part of the light ends of the polymer gasoline separated in the fractionator 14 and withdrawn through the line 25 may be passed through a line 38 to the gasoline receiver 22. While I have shown the merging of part of the light ends of gasoline with the heavier ends thereof prior to entering the gasoline receiver 22, it will be obvious that they may be separately introduced into the receiver 22.

A further degree of control over the volatility of the final product is provided by fractionator 33 wherein the cooling and condensing may be varied to give a product for withdrawal from line 36 having an initial boiling point varying from a conventional value such as about 100° F. to a relatively high value such as 200° F. With the latter method of operation the light ends of gasoline boiling up to 200° F. will be carried overhead with the normally gaseous hydrocarbons through line 34 for refractionation and retreatment. When it is desired that the final product shall have a relatively high initial boiling point, as for use as so-called safety fuel, no light polymer will be diverted from line 25 through line 38 to receiver 22. If desired, the polymer liquid from fractionator 33 may be withdrawn separately through line 42 for independent distillation and recovery of desired gasoline constituents.

If desired, part or all of the normally gaseous hydrocarbons passing through the line 15 may be merged with the light ends of the polymer gasoline withdrawn through the line 25 for processing in the second stage of the polymerization system. It is generally preferred, however, to seperate the C₄ fraction from the normally gaseous hydrocarbons prior to being withdrawn through the line 15 and collect the C₄ fraction with the light ends of polymer gasoline for passage through the furnace 27, the C₂ and C₃ fractions remaining after separation of the C₄ fraction being recycled to the furnace 3 as described for reprocessing. Under some circumstances it may be desirable to operate fractionator 14 so that all or most of the C₄ fraction is included in the gases passing overhead through line 15.

As a modification of my invention, the normally gaseous hydrocarbons introduced through the line 1 may be separated into a fraction containing ethylene and ethane and another fraction containing the heavier hydrocarbons. The ethylene-ethane fraction may be thermally polymerized under optimum conditions of temperature and pressure and the fraction containing the heavier hydrocarbons catalytically polymerized under optimum conditions. Any suitable catalyst may be used in the catalytic stage, such, for example, as sodium aluminate chloride, alumina on silica, phosphoric acid, and others. The light ends produced by the thermal polymerization of the ethylene-ethane fraction may be processed in a manner similar to the light ends withdrawn through the line 25, the polymer therefrom being blended with the polymer produced by the catalytic polymerization stage, this polymer usually containing no excess of light ends and, as a result, having an extremely low volatility.

While I have described my invention in detail with reference to specific operating features, it is to be clearly understood that my invention is not limited in these respects except as appearing in the appended claims.

I claim:

1. A process for the conversion of normally gaseous hydrocarbons to gasoline motor fuel which comprises heating normally gaseous hydrocarbons under superatmospheric pressure to effect conversion thereof to normally liquid products, fractionating the resulting reaction products to obtain therefrom a gasoline fraction including the heavy ends of gasoline, a light gasoline fraction including in substantial proportion the normally liquid light ends of gasoline and substantially free of heavy ends of gasoline, and a normally gaseous fraction, heating said light gasoline fraction under superatmospheric pressure to effect conversion thereof to normally liquid hydrocarbons containing heavy ends of gasoline, and introducing liquid products of said last-mentioned conversion treatment including said heavy ends of gasoline into said fractionating operation whereby said heavy ends of gasoline produced by said last-mentioned conversion operation are recovered with said first-mentioned gasoline fraction.

2. The method in accordance with claim 1 wherein the products of the conversion treatment of said light gasoline fraction are first separated into a gas fraction and a liquid fraction, and the fractions thus obtained are separately introduced into the said first-mentioned fractionation operation.

3. A process for the conversion of normally gaseous hydrocarbons to gasoline motor fuel which comprises heating normally gaseous hydrocarbons under superatmospheric pressure to effect conversion thereof to normally liquid products, fractionating the reaction products thus obtained to separate therefrom a normally gaseous fraction, a light gasoline fraction including in substantial proportion the normally liquid light ends of gasoline and substantially free from the heavy ends of gasoline, and a fraction containing the heavy ends of gasoline, fractionating the last-mentioned fraction to recover therefrom a gasoline fraction as a product of the process, heating said light gasoline fraction under superatmospheric pressure to effect conversion thereof into normally liquid hydrocarbons containing heavy ends of gasoline, separating the products of said last-mentioned conversion operation into a normally gaseous fraction and a normally liquid fraction, introducing said last-mentioned normally liquid fraction into the fractionation operation on the fraction containing the heavy ends of gasoline from the first-mentioned conversion operation whereby gasoline constituents from the conversion of said light gasoline fraction are included in the gasoline product of the process.

4. A process for the conversion of normally gaseous hydrocarbons to gasoline motor fuel which comprises heating normally gaseous hydrocarbons under superatmospheric pressure to effect conversion thereof to normally liquid products, fractionating the reaction products thus obtained to separate therefrom a gaseous fraction consisting of hydrocarbons having less than three carbon atoms per molecule and lighter gases, further fractionating the remaining products of said conversion treatment to separate therefrom a normally gaseous fraction, a light gasoline fraction containing in substantial proportion the normally liquid light ends of gasoline and substantially free of the heavy ends of gasoline, and a fraction containing the heavy ends of gasoline, further fractionating said last-mentioned fraction to separate therefrom a gasoline fraction as a product of the process, recycling at least a portion of said normally gaseous fraction to said conversion treatment, heating said light gasoline fraction under superatmospheric pressure to effect conversion thereof to normally liquid hydrocarbons including the heavy ends of gasoline, separating the products of said last-mentioned conversion operation into a gas fraction and a liquid fraction, introducing said last-mentioned gas fraction into said first-mentioned fractionation treatment whereby normally gaseous hydrocarbons suitable for recycling to the first-mentioned conversion operation are recovered in said normally gaseous fraction obtained from said second-mentioned fractionation treatment, and introducing said last-mentioned liquid fraction into the fractionation treatment of the fraction containing the heavy ends of gasoline from the first-mentioned conversion treatment whereby the gasoline constituents contained in said liquid fraction of the products of conversion of said light gasoline fraction are included in the gasoline product of the process.

5. The method in accordance with claim 4 wherein the products of conversion of said light gasoline fraction are fractionated to include in said gas fraction the light ends of gasoline contained in said reaction products.

6. A process for the conversion of normally gaseous hydrocarbons to gasoline motor fuel which comprises heating normally gaseous hydrocarbons under superatmospheric pressure to effect conversion thereof to normally liquid products, fractionating the products of said conversion operation to separate therefrom a light gasoline fraction containing in substantial proportion the normally liquid light ends of gasoline and substantially free from the heavy ends of gasoline, and a gasoline fraction containing the heavy ends of gasoline, heating the said light gasoline fraction under superatmospheric pressure to effect conversion thereof to normally liquid hydrocarbons including the heavy ends of gasoline, and fractionating the products of said last-mentioned conversion operation conjointly with the products of said first-mentioned conversion operation in said fractionation treatment.

7. The method in accordance with claim 6 wherein a portion of said light gasoline fraction is blended with said gasoline fraction containing the heavy ends of gasoline to produce a motor fuel of desired volatility.

8. A process for the conversion of normally gaseous hydrocarbons to gasoline motor fuel which comprises heating normally gaseous hydrocarbons under superatmospheric pressure to effect conversion thereof to normally liquid products, fractionating the products of said conversion operation into normally gaseous hydrocarbons, a light gasoline fraction containing in substantial proportion the normally liquid light ends of gasoline and substantially free of the heavy ends of gasoline, and a liquid fraction containing the heavy ends of gasoline, fractionating the last-mentioned liquid fraction to separate therefrom a gasoline fraction containing the heavy ends of gasoline, blending a portion of said light gasoline fraction with said gasoline fraction containing the heavy ends of gasoline to produce a motor fuel product of desired volatility, heating the remaining portion of the light gasoline fraction under superatmospheric pressure to effect conversion thereof to normally liquid hydrocarbons including the heavy ends of gasoline, and fractionating the products of said last-mentioned conversion operation conjointly with the products of said first-mentioned conversion operation in said first-mentioned fractionation treatment.

9. A process for the conversion of normally gaseous hydrocarbons to gasoline motor fuel which comprises heating normally gaseous hydrocarbons under superatmospheric pressure to effect conversion thereof to normally liquid products, fractionating the products of said conversion operation to separate therefrom a light gasoline fraction containing in substantial proportion the normally liquid light ends of gasoline and substantially free from the heavy ends of gasoline and a fraction containing the heavy ends of gasoline, heating the said light gasoline fraction under superatmospheric pressure to effect conversion thereof to normally liquid hydrocarbons including the heavy ends of gasoline, and blending gasoline constituents of the reaction products of said last-mentioned conversion operation with said gasoline constituents of said fraction containing the heavy ends of gasoline to produce a motor fuel of desired volatility.

10. The method in accordance with claim 9 wherein the products of the conversion treatment of said light gasoline fraction are fractionated to obtain normally gaseous hydrocarbons suitable for further conversion treatment and said last-mentioned normally gaseous hydrocarbons are passed to said first-mentioned conversion treatment for processing therein.

11. A process for the conversion of normally gaseous hydrocarbons to gasoline motor fuel which comprises heating normally gaseous hydrocarbons under superatmospheric pressure to effect conversion thereof to normally liquid products, fractionating the products of said conversion operation to separate therefrom a light normally liquid gasoline fraction substantially free from the heavy ends of gasoline, and a gasoline fraction containing the heavy ends of gasoline, heating the said light gasoline fraction under superatmospheric pressure to effect conversion thereof to normally liquid hydrocarbons including the heavy ends of gasoline, and fractionating the products of said last-mentioned conversion operation conjointly with the products of said first-mentioned conversion operation in said fractionation treatment.

12. In the manufacture of normally liquid hydrocarbons from normally gaseous hydrocarbons, the process that comprises subjecting said normally gaseous hydrocarbons to elevated conditions of temperature and pressure to effect conversion thereof, separating the products of conversion into a fraction consisting predominantly of hydrogen and methane, a fraction consisting predominantly of normally gaseous hydrocarbons having two to four carbon atoms per molecule, a fraction containing the heavy ends of gasoline and a fraction consisting predominantly of hydrocarbons having five and six carbon atoms per molecule, removing the fraction consisting predominantly of hydrogen and methane from the process, subjecting the fraction consisting predominantly of normally gaseous hydrocarbons having two to four carbon atoms per molecule to elevated conditions of temperature and pressure to effect conversion thereof, recovering the heavy ends of gasoline from the fraction containing same, subjecting the fraction consisting predominantly of hydrocarbons having five and six carbon atoms per molecule to elevated conditions of temperature and pressure to effect conversion thereof into normally liquid hydrocarbons containing the heavy ends of gasoline and normally gaseous hydrocarbons, separating normally gaseous hydrocarbons thus derived from said normally liquid hydrocarbons and returning said gaseous hydrocarbons to the separation stage for the products of conversion resulting from the subjection of the normally gaseous hydrocarbons to elevated conditions of temperature and pressure.

13. In the manufacture of normally liquid hydrocarbons from normally gaseous hydrocarbons, the process that comprises subjecting said normally gaseous hydrocarbons to elevated conditions of temperature and pressure to effect conversion thereof, separating the products of conversion into a fraction containing normally gaseous hydrocarbons having $C_4$ constituents and lighter, a fraction containing the heavy ends of gasoline and a fraction containing the lighter ends of gasoline which comprises $C_5$ and $C_6$ hydrocarbons, recovering said heavy ends of gasoline from the fraction containing same, subjecting a part of said fraction containing the lighter ends of gasoline to elevated conditions of temperature and pressure to effect conversion thereof into normally liquid hydrocarbons containing heavy ends of gasoline, recovering said heavy ends of gasoline last mentioned and admixing another part of said fraction containing the lighter ends of gasoline with said heavy ends of gasoline to obtain a gasoline of desired volatility.

HAROLD V. ATWELL.